United States Patent
Mourn

(10) Patent No.: US 12,222,799 B2
(45) Date of Patent: Feb. 11, 2025

(54) IEEE-1394 BETA FAST RECONNECT METHOD

(71) Applicant: DapHolding B.V., Oldenzaal (NL)

(72) Inventor: Richard Mourn, Colorado Springs, CO (US)

(73) Assignee: DapHolding B.V., Oldenzaal (NL)

( * ) Notice: Subject to any disclaimer, the term of this patent is extended or adjusted under 35 U.S.C. 154(b) by 219 days.

(21) Appl. No.: 18/124,953

(22) Filed: Mar. 22, 2023

(65) Prior Publication Data
US 2023/0229536 A1 Jul. 20, 2023

Related U.S. Application Data

(63) Continuation of application No. 14/197,953, filed on Mar. 5, 2014, now abandoned.

(51) Int. Cl.
G06F 11/07 (2006.01)
G06F 13/42 (2006.01)

(52) U.S. Cl.
CPC ...... *G06F 11/0745* (2013.01); *G06F 13/4282* (2013.01); *G06F 2213/0002* (2013.01)

(58) Field of Classification Search
CPC ............. G06F 11/0745; G06F 13/4282; G06F 2213/0002
See application file for complete search history.

(56) References Cited

U.S. PATENT DOCUMENTS

| | | | |
|---|---|---|---|
| 6,931,198 B1 * | 8/2005 | Hamada | H04N 7/163 386/314 |
| 7,668,202 B2 | 2/2010 | Gillet | |
| 8,291,241 B2 | 10/2012 | Smith et al. | |
| 8,582,750 B2 | 11/2013 | Lee et al. | |
| 8,761,101 B1 | 6/2014 | Crosbie et al. | |
| 9,274,578 B2 | 3/2016 | Mullins et al. | |
| 9,411,003 B2 | 8/2016 | Danesh et al. | |
| 2006/0074525 A1 * | 4/2006 | Close | B25J 9/1617 700/245 |

* cited by examiner

Primary Examiner — Jigar P Patel
(74) Attorney, Agent, or Firm — Spencer Fane LLP; Steven J. Laureanti

(57) ABSTRACT

A method for quickly testing an electrical connection used between two nodes. For example, the method can be used with an IEEE-1394-2008 Beta serial bus. The testing is used to determine if a disconnect signal is a permanent disconnect signal or a temporary disconnect signal. Also, the testing provides for a fast reconnect that attempts one or more times to determine a temporary disconnect, thus creating a range in microseconds to milliseconds in which to verify the temporary disconnect. Also, the number of attempts can be replaced by a certain time period.

20 Claims, 2 Drawing Sheets

IEEE-1394 BETA FAST RECONNECT METHOD

CROSS-REFERENCE TO RELATED APPLICATIONS

This application is a continuation of U.S. patent application Ser. No. 14/197,953, filed on Mar. 5, 2014, entitled "IEEE-1394 Beta Fast Reconnect Method,". U.S. patent application Ser. No. 14/197,953 is assigned to the assignee of the present application.

BACKGROUND

This invention relates to the performance of an IEEE-1394 serial bus, and more particularly, but not by way of limitation, to a reconnect method to verify a temporary disconnect between two nodes. The reconnect method called "Beta fast reconnect method" herein.

A standard IEEE-1394 serial bus was originally designed to operate in a plug and play market allowing computers, TVs, STB, camcorders, hard disk drives, etc. . . . to be connected to and disconnected from one another. This standard serial bus is programmed in a way where a node's port doesn't know the difference between a physical disconnect or a temporary disconnect. The temporary disconnect between nodes is typically caused by a noise event.

Heretofore, there have been a number of IEEE 1394-coupled communication system and method patents. For example, they are U.S. Pat. No. 7,681,051 to Liu et al., U.S. Pat. No. 7,036,031 to Takeuchi, U.S. Pat. No. 6,912,596 to Skidmore, U.S. Pat. No. 6,523,073 to Kammer et al., and U.S. Pat. No. 6,412,076 to Honda et al. None of these patents specifically describe the unique features and method for providing a Beta fast reconnect method between two nodes.

OBJECTS OF THE INVENTION

In view of the foregoing, it is a primary object of the subject invention to provide tests to determine if a connection between two nodes has been physically broken or has temporarily lost connection due to loss of synchronization, which may be caused by noise or some other event.

Another object of the invention is to provide a fast reconnect that attempts one or more times to determine a temporary disconnect, thus creating a range in microseconds to milliseconds in which to verify a temporary disconnect. Also, the number of attempts can be replaced by a certain time period.

These and other objects of the present invention will become apparent to those familiar with IEEE-1394 serial bus technology related to a connection and a disconnection between two different nodes when reviewing the following detailed description, showing novel construction, combination, and elements as described herein.

DETAILED DESCRIPTION

Figure 1:
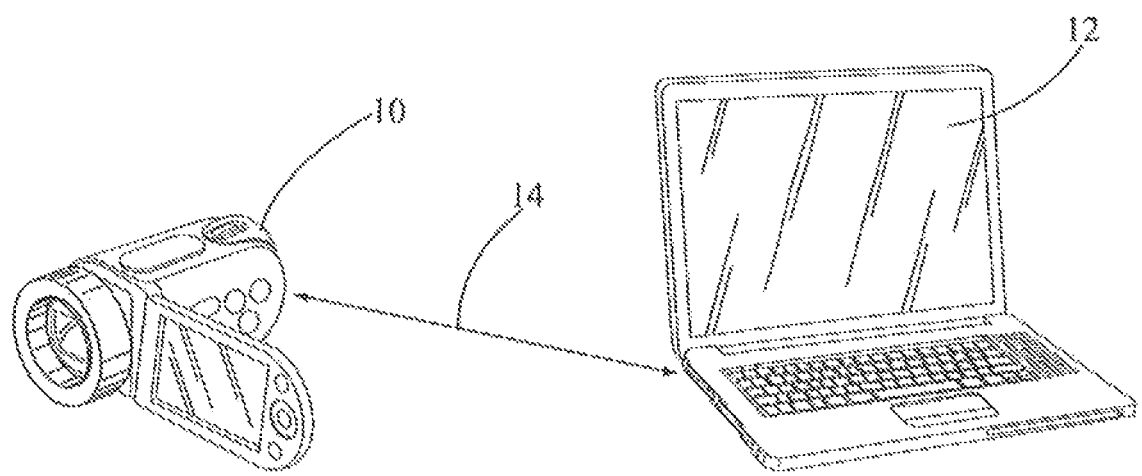
FIG. 1 illustrates a camcorder connected to a computer via an electric lead.
Figure 2:
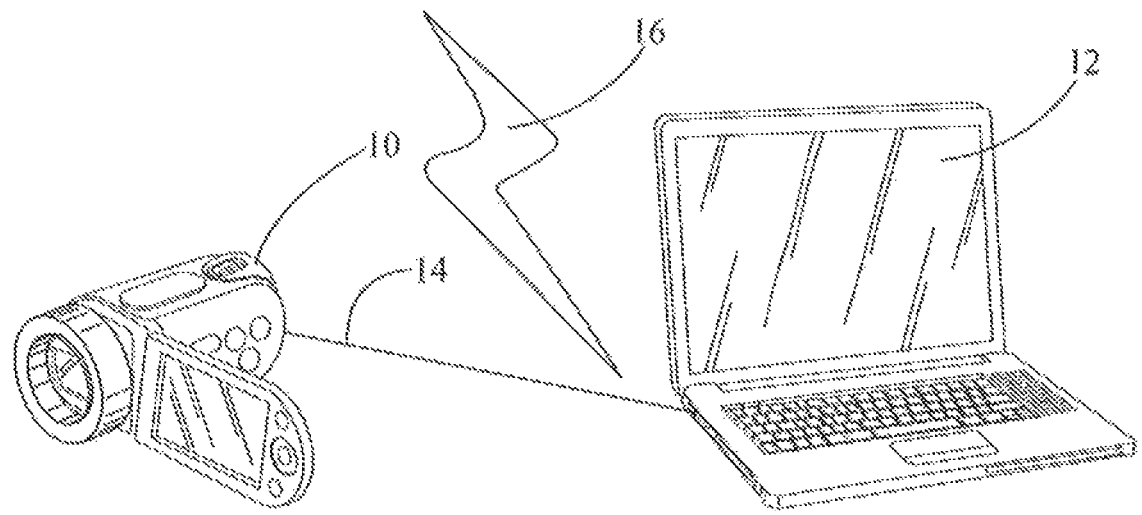
FIG. 2 illustrates a physical disconnect between the camcorder and the computer due to a noise event.

The accompanying drawings illustrate complete preferred embodiments in the present invention according to the best modes presently devised for the practical application of the subject Beta fast reconnect method, and in which:

In FIG. 1, a camcorder 10 is shown connected to a computer 12 via an electrical lead 14. The standard for IEEE-1394 for connection of this type of electronic equipment is written in a way where a nodes port doesn't know the difference between a physical disconnect, for example when a user unplugs the camcorder 10 from the computer 12, as shown in this drawing, or a temporary loss of connectivity caused by a noise event 16, as shown in FIG. 2. The noise event 16 can be caused by lightning strikes, a strobe light, static electricity and the like.

As currently defined a temporary loss of connectivity will cause at least a 500 msec delay in communication before the two nodes are reconnected. The subject Beta fast reconnect method provides tests to see if a connection is physically broken or if a temporary loss of connectivity is experienced, thus allowing a much faster reconnect time.

Figure 3:
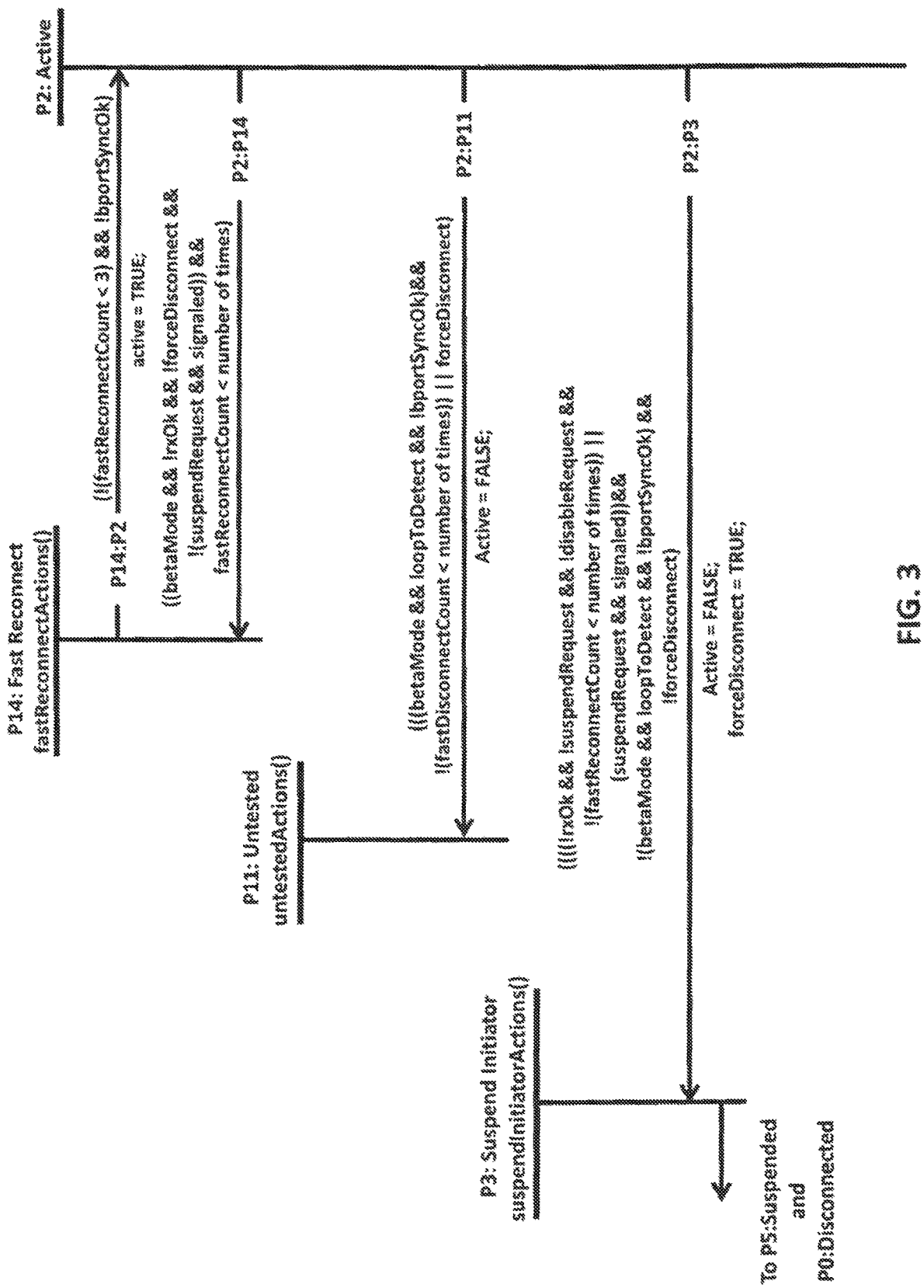
FIG. 3 illustrates various method steps on reconnecting a standard IEEE-1394-2008 Beta serial bus when disconnected due to a noise event, shown in FIG. 2.

In FIG. 3, the following discussion is illustrated. In a standard IEEE-1394-2008 Beta serial bus, if the portError-Monitor's invalid Count equals 4, rxOk and bportSync becomes false, thus causing a Port Connect State Machine to transition from P2: Active to either P11: Untested (in bus reset phase) or P3: Suspend Initiator (not in bus reset phase) and ultimately to the P0: Disconnected state. This also causes syncErrorSignal to become true and bportOn false causing the Receive and Transmit state machines to transition to off. If the port is still connected and not disabled eventually toning starts back up and the ports reconnect just like a new physical connection has been made. While this process allows for a reconnect it takes about 500 msec to complete. For some markets like, Aerospace & Defense, 500 msec (millisecond) is a considerable amount of time therefore it is desirable to shorten this time as described herein.

The method described herein does not change disconnecting when invalidCount equals 4. However the value can be changed to something larger. This will reduce the number of disconnects due to invalid symbols. Also, the method retries the fastConnectActions 1 to a number of times before failing. Further, the method creates a range of 1 microseconds to 300 milliseconds to verify a temporary disconnect occurred. The range is determined by the number of times fastConnectActions must be attempted or could be bound by a period of time.

If a physical disconnect or serious interruption in signaling occurs, the method will try to resynchronize the port one or more times. Each attempt will try up to a RECEIVE_O-K_HANDSHAKE time (5.3 milliseconds to 16 milliseconds) for synchronization. If after one or more attempts, synchronization is not successful, the port will transition to the P3: Suspend Initiator state. This may delay the bus reset caused by the disconnection from being observed for "number of times" RECEIVE_OK_HANDSHAKE after the disconnect actually occurred. If the disconnected node(s) is root/boss then nodes requesting the bus will MAX_ARB_STATE_TIME (200 microseconds to 400 microseconds) timeout which will cause a long bus reset. For non-plug-n-play environments this will be extremely rare.

If resynchronization is successful, the port reconnects and then a long bus reset is initiated. This means the best case loss of synchronization to resumption of normal bus activity is about 200 microseconds.

If the port maintains a valid connection for a RECEIVE_OK_HANDSHAKE time, the reconnection is considered to be successful, temporary disconnect was determined, and the fastReconnectCount, is reset back to 0. If the port loses synchronization within a RECEIVE_OK_HANDSHAKE TIME, the reconnection is considered to be unsuccessful and the fastReconnectCount is incremented. When the fastReconnectCount reaches number of times or the test timer expires, a permanent disconnect is determined.

Further the subject test method, if successful, will reconnect in a range of 1 microseconds to 300 milliseconds. This feature adds a fastReCon mode of operation. This mode is configurable through a PHY register or through hardware configuration means.

The PHY register fastReCon field definition is as follows:

| Field | Size | Type | Power reset value | Description |
|---|---|---|---|---|
| fastReCon | 1 | Rw | See description | Is cleared or set by software to control the value of fastReCon. When set to zero the PHY layer operation doesn't include fast reconnect support. When set to one fast reconnect support is enabled. If hardware implementation-dependent means are not available to configure the power reset value of this field, the power reset value shall be zero. |

The updated Port Connect State Machine state diagram, shown in FIG. 3, only shows a new state, state transitions and those requiring changes. For the complete Port Connect State Machine state diagram please consult IEEE-1394-2008 Figure 14-2.

Port Connect State Machine C-Code Changes:

```
Case P1: Added
    //If in this state sync'd and could transition to P2:Active so clear
    fastReconnectCount = 0;
Case P2: New
    case P2:
        nextStateUnknown = TRUE;
        if (connectTimer > RECEIVE_OK_HANDSHAKE){fastReconnectCount = 0;}
        for ... {
            if .... { }
            else if ... {}
            //New
            else if (betaMode && !rxOk && !forceDisconnect && !(suspendRequest && signaled)
                && (fastReconnectCount <number of times)) {
                active = TRUE;
                portState = P14;
                nextStateUnKnown = FALSE;
            }
            else if (((betaMode && loopToDetect && !bportSyncOk)&&
                    !(fastDisconnectCount <number of times)) II forceDisconnect){
                Active = FALSE;
                forceDisconnect = TRUE;
                portState = P11;
                nextStateUnknown = FALSE;
            }
            else if (((((!rxOk && !suspendRequest && !disableRequest &&
                    !(fastReconnectCount < number of times)) II
                    (suspendRequest && signaled))&&
                    !(betaMode && loopToDetect && !bportSyncOk) &&
                    !forceDisconnect) {
                ... }
        ... break;
Case P10: Added
    //If in this state sync'd and could transition to P2:Active so clear
    fastReconnectCount = 0;
Case P11: Added
    //If in this state sync'd and could transition to P2:Active so clear
    fastReconnectCount = 0;
Added a new fastReconnect state of P14
case P14:
    if (fastReconnectCount <number of times && !bportSyncOk){
        fastReconnectActions( );
    }
    else{
    }
        active = TRUE;
        portState = P2;
        nextStateUnknown = FALSE;
    }
    break;
}
New fastReconnectActions C-code:
void Fire WirePort::fastReconnectActions( )
```

```
{
    If (startResumePort( )){
        for(; !mstopOnNextCycle && (rxOk)); suspend( )){
            if(rxOk){
                mPhy->okToDectectReset = TRUE;
            }
        }
        mPhy->ibr = mPhy->resumptionDone = TRUE;
    }
resumeFault = !rxOk;
if (betaMode && !rxOk){
        syncFail = TRUE;
        fastReconnectCount++;
}
Resume = FALSE;
}
Changes to FireWirePort::connectionStatus( ) C-code:
void Fire WirePort::connectionStatus( )
{
    ...
        If (portState == P1 .... {
        }
        If (forceDisconnect) {
        ...
        }
        Goto label_begin;
    }
        //New
        else if (portState == P14){
            break;
        }
    ...
```

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A method of fast testing of an IEEE-1394-2008 Beta serial bus connection between two nodes, the method comprising:
    setting a IEEE-1394-2008 Beta serial bus connection Port Error Count threshold to a customizable number;
    monitoring the serial bus connection between the two nodes to determine a disconnect condition;
    in response to determining the disconnect condition, repeatedly attempting fast reconnection with a number of attempts up to the customizable number;
    in response to the repeated fast reconnection attempts establishing a reconnection after the number of attempts do not reach the customizable number, resetting a count of the number of attempts to zero; and
    in response to the attempted fast reconnection attempts not establishing a reconnection after reaching the customizable number, determining a permanent disconnect has occurred and setting a port connect state to disconnected.

2. The method of claim 1, further comprising:
    repeatedly attempting fast reconnection with a number of attempts for an adjustable time period or up to the customizable number, whichever is reached first.

3. The method of claim 2, further comprising:
    resetting the count of the number of attempts to zero after the number of attempts to establish a reconnection do not exceed the adjustable time period or reach the customizable number.

4. The method of claim 3, further comprising:
    determining a permanent disconnect has occurred and setting a port connect state to disconnected, in response to the number of attempts not establishing a reconnection after reaching the adjustable time period elapsing or the number of attempts reaching the customizable number.

5. The method of claim 4, wherein a fast reconnection attempt further comprises:
    resynchronizing comprising performing a receive handshake process within a time limit, and in response to performing the receive handshake process within the time limit, reconnecting the two nodes.

6. The method of claim 5, further comprising:
    in response to not completing a receive handshake process within the time limit, incrementing a current count of the number of attempts by 1.

7. The method of claim 6, wherein when the receive handshake process is performed within a time limit, reconnecting the two nodes.

8. The method of claim 6, further comprising initiating a long bus reset, when the two nodes are reconnected.

9. The method of claim 1, wherein the monitoring the serial bus connection further comprises:
    monitoring the IEEE-1394-2008 Beta serial bus connection Port Error Count register to determine the disconnect condition.

10. The method of claim 1, wherein the customizable number is greater than 4.

11. The method of claim 2, wherein the adjustable time period comprises a period between 1 microseconds and 300 milliseconds.

12. A method of fast testing of an IEEE-1394-2008 Beta serial bus connection between two nodes, the method comprising:
    monitoring a connectivity of a serial bus connection between the two nodes to determine a pending port disconnect state transition by monitoring a IEEE-1394-2008 Beta serial bus connection Port Error Count register;

determining a potential disconnect condition by detecting the IEEE-1394-2008 Beta serial bus connection Port Error Count register increment upon detection of a temporary loss of connectivity;

in response to determining the potential disconnect condition, repeatedly attempting fast reconnection with a number of attempts up to a customizable number;

in response to the repeated fast reconnection attempts establishing a reconnection after the number of attempts did not reach a number greater than the number, resetting a count of the number of attempts to zero; and in response to the attempted fast reconnection attempts not establishing a reconnection after reaching the number, determining a permanent disconnect has occurred and setting a port connect state to disconnected.

13. The method of claim 12, further comprising:

repeatedly attempting fast reconnection with a number of attempts for an adjustable time period or up to the customizable number, whichever is reached first.

14. The method of claim 13, further comprising:

resetting the count of the number of attempts to zero after the number of attempts to establish a reconnection do not exceed the adjustable time period or reach the customizable number.

15. The method of claim 14, further comprising:

determining a permanent disconnect has occurred and setting a port connect state to disconnected, in response to the number of attempts not establishing a reconnection after reaching the adjustable time period elapsing or the number of attempts reaching the customizable number.

16. The method of claim 15, wherein a fast reconnection attempt further comprises:

resynchronizing comprising performing a receive handshake process within a time limit, and in response to performing the receive handshake process within the time limit, reconnecting the two nodes.

17. The method of claim 16, further comprising:

in response to not completing a receive handshake process within the time limit, incrementing a current count of the number of attempts by 1.

18. The method of claim 17, wherein when the receive handshake process is performed within a time limit, reconnecting the two nodes.

19. The method of claim 17, further comprising initiating a long bus reset, when the two nodes are reconnected.

20. The method of claim 13, wherein the customizable number is greater than 4 and wherein the adjustable time period comprises a period between 1 microseconds and 300 milliseconds.

* * * * *